Figure 1:
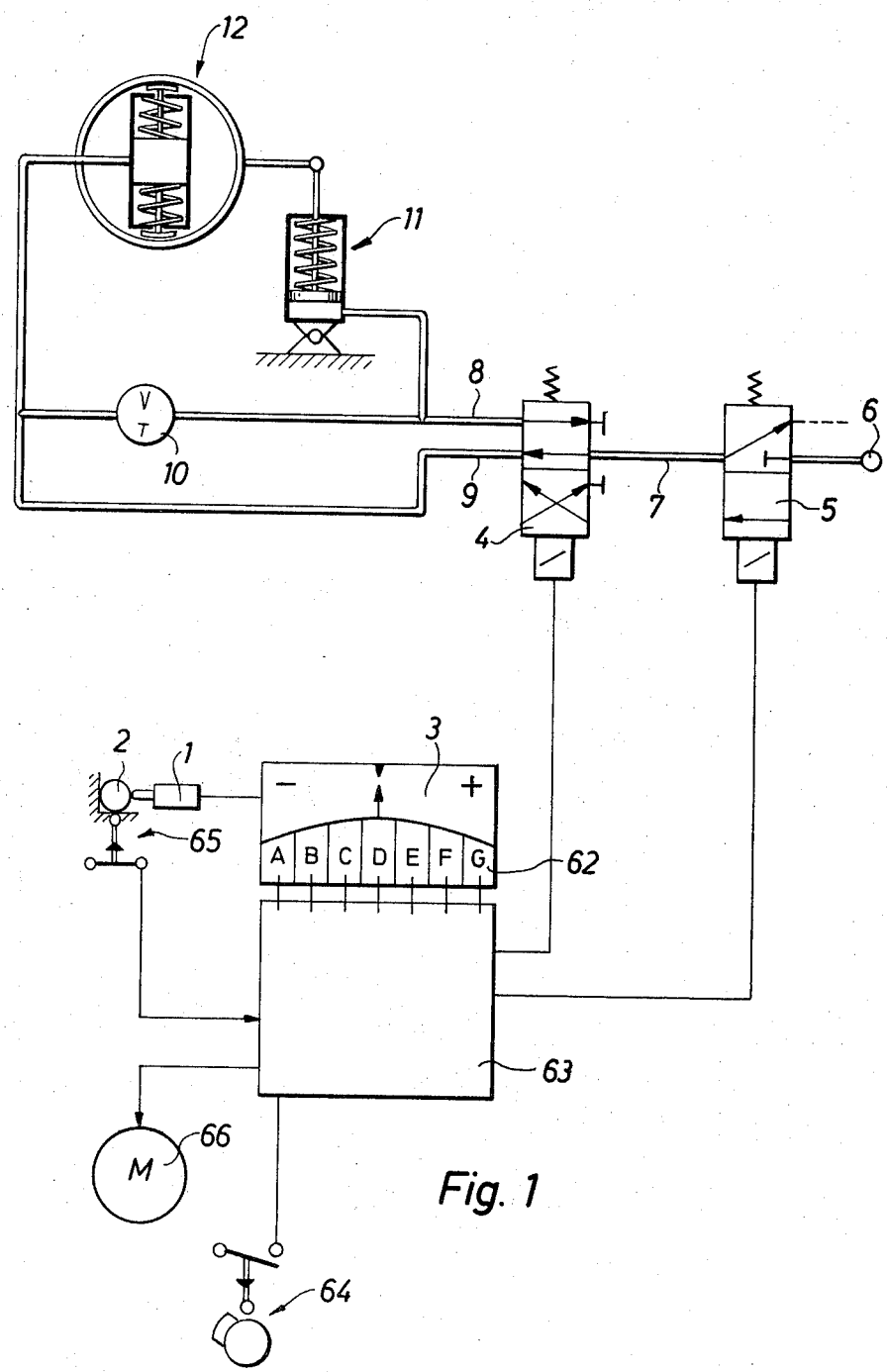

United States Patent [19]
Wiesner

[11] 3,863,528
[45] Feb. 4, 1975

[54] APPARATUS FOR ADJUSTING A TOOL SLIDE OF A MACHINE TOOL

[75] Inventor: Franz Wiesner, Owen, Germany

[73] Assignee: Traub GmbH, Reichenbach/Fils, Germany

[22] Filed: Nov. 3, 1972

[21] Appl. No.: 303,341

[30] Foreign Application Priority Data
Nov. 26, 1971 Germany............................ 2158813

[52] U.S. Cl................................ 82/21 A, 82/14 A
[51] Int. Cl.......................... B23b 21/00, B23b 3/28
[58] Field of Search............................ 82/21 A, 14 A

[56] References Cited
UNITED STATES PATENTS

| | | | |
|---|---|---|---|
| 2,372,427 | 3/1941 | Johnson | 82/14 A |
| 2,422,682 | 6/1947 | Johnson | 82/14 A |
| 2,693,125 | 11/1954 | Von Zelewsky | 82/14 A |
| 2,819,639 | 1/1958 | Grover | 82/14 A |
| 2,882,777 | 4/1959 | Hirvonen | 82/14 A |
| 3,044,266 | 7/1962 | Svenson | 82/21 A |
| 3,528,082 | 9/1970 | Newton | 82/21 A |
| 3,603,184 | 9/1971 | Berly | 82/14 A |

Primary Examiner—Harrison L. Hinson
Attorney, Agent, or Firm—Roylance, Abrams, Berdo & Kaul

[57] ABSTRACT

A sensor produces signals indicating the proportions of a workpiece being machined on a machine tool, which signals control, through a control device the actions of pressure fluid valves disposed in a pressure fluid circuit. The flow of pressure fluid is used to control the rotation of an adjustment spindle through which the position of the machine tool slide guide can be controlled so that the porportions of the next machined workpiece can be made the same as the previously machined model workpiece.

8 Claims, 3 Drawing Figures

APPARATUS FOR ADJUSTING A TOOL SLIDE OF A MACHINE TOOL

The invention relates to an apparatus for the adjustment of a tool slide in a machine tool, particularly but not exclusively in a lathe in dependence upon the exact proportions of a workpiece previously machined on the machine tool and by means for measuring these proportions and means for the displacement of the tool slide.

In a known apparatus, the modification of the length of a metal bar, with modification of the temperature of the bar, is utilised for displacement of the tool cutter. The expense of regulating the level of the temperature of the bar by means of an induction coil is very high.

An apparatus is also known in which the tool slide is movably mounted by means of elastic members and is adapted to be displaced by the pressure action of a pressure means. The regulated position of the tool results from the equilibrium of the forces of the return spring power of the elastic members and the force of the pressure power of the pressure means. The slide is thus capable of being easily influenced by external forces, but undesirable modifications of the position of the tool slide can thereby occur. If the action of these external forces is to be reduced, high expenditure and a large space are required. Furthermore, a relatively expensive measuring and control part is needed.

According to the present invention, there is provided apparatus for adjusting the tool slide of a machine tool in dependence upon the proportions of a model workpiece previously machined on the machine tool comprising means for determining the proportions of the workpiece, means for displacing the tool slide, pressure fluid control valve means responsive to the means for determining the proportions of the workpiece and operative to allow pressure fluid flow from a pressure fluid source to the means for displacing the tool slide. Preferably, the means for displacing the tool slide comprises an adjustment spindle and a pivot means connected to the spindle through a pressure fluid operable coupling. This latter arrangement enables the regulation of a tool slide in a machine tool, with the aid of which apparatus an optional number of adjustment steps can be carried out in both rotary directions of the adjustment spindle. With the aid of an apparatus designed in this manner, for an automatically operating machine tool with working processes which proceed constantly in a similar manner, automatic correction of machining errors is possible, when those errors are due to the influence of heat, the wearing of cutters etc. For the continuous production of identical workpieces on the same machine tool, deviations which occur in the actual dimensions of the workpiece from the required dimensions of the workpiece can be kept within narrow tolerated limits by automatic correction of the position of the tool slide. The adjusting spindle can be designed in the form of an adjoining stop or as the obstructing spindle of a tool spindle. The apparatus is of simple design and can be easily supervised and mounted on machine tools which are already complete. The expense of the measuring device and the control part can be kept low, since during the stroke of the machine tool for the machining of each workpiece, the adjustment signals which occur in the control part can be transmitted to the adjustment spindle, corresponding to the dimensions of the workpiece which has just been produced with regard to their number and direction.

Figure 2:
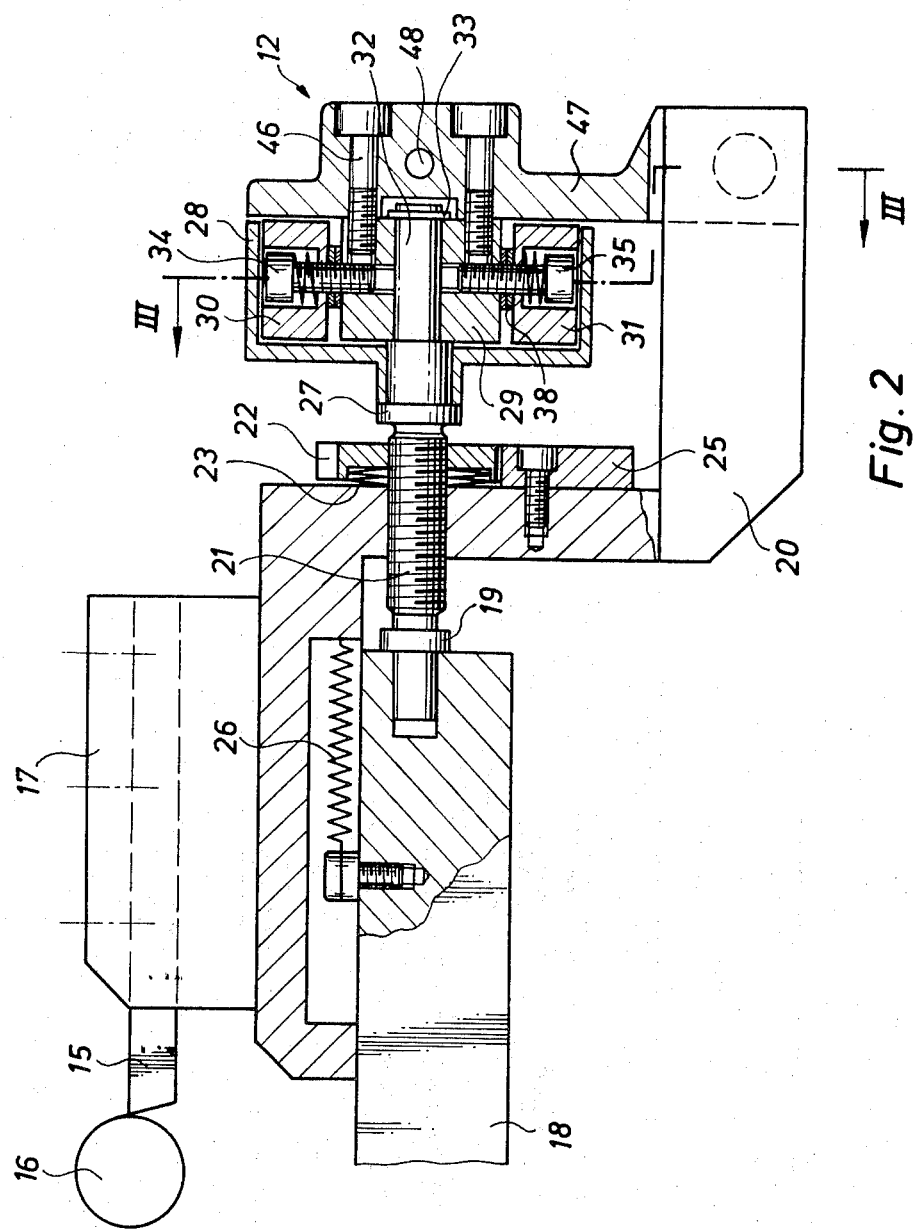
Figure 3:
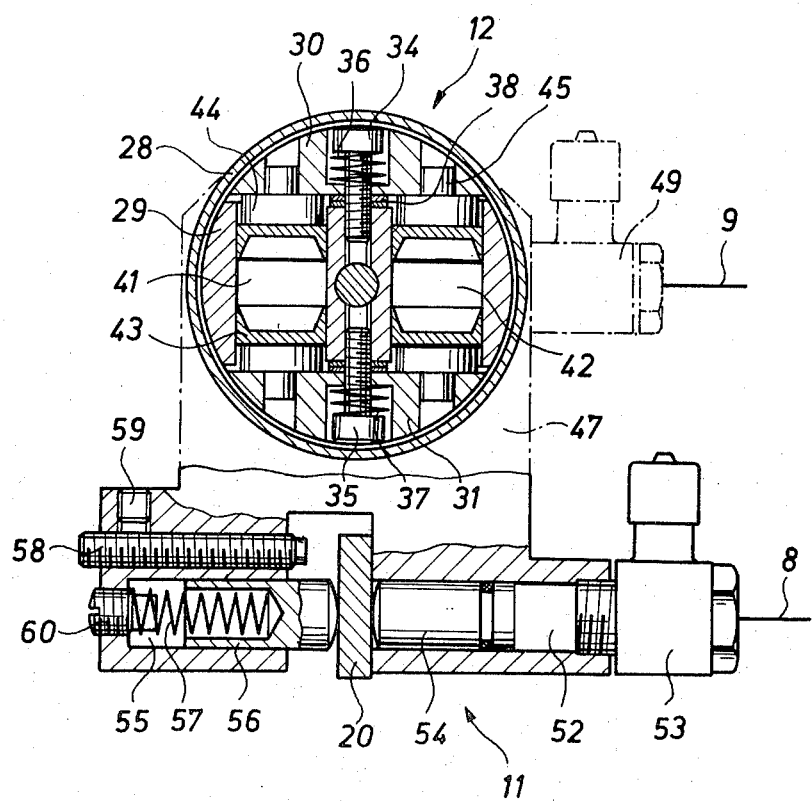

In order that the invention may be more fully understood, one embodiment of the invention will now be described, by way of example, with reference to the accompanying drawings in which, FIG. 1 shows a circuit diagram, for the regulation of a tool slide in an automatic lathe, FIG. 2 shows a side view of the automatic lathe in partial longitudinal section, FIG. 3 shows a section taken along the line III—III of FIG. 2.

Referring to FIG. 1, the apparatus has a stationary measuring sensor 1 for measurement of the diameter of a workpiece 2. The measuring sensor 1 is attached to a measuring device 3, which indicates visually the currently existing proportions at a certain point of the workpiece 2. Sensor 1 is initially adjusted with a previously machined piece in place so that device 3 indicates a center scale reading. Subsequent workpieces will yield similar readings if they are being properly machined. A classification device 62 is connected to the measuring device 3 having the classes of measurement A to G, and a control function 63 to the classification device 62. This control function is connected to a switch 64 controlled by cams. A switch 65 serves to verify the presence of the workpiece 2. A driving motor 66 for the automatic lathe and also a positioning valve 4 and a graduated valve 5 are connected independently of each other to the control function 63. The valves 4, 5 are designed as magnetically operated passage valves with four or three ports respectively. To one of the ports of the graduated valve 5, a source 6 of hydraulic or pneumatic pressure is attached. The valves are connected to each other via a conduit. One of the ports of the positioning valve 4 is sealed, whereas the two remaining ports are connected to supply pipes 8 and 9, between which an adjustable throttle position is situated. The supply pipe 8 is connected to a pivot mechanism 11 and the supply pipe 9 is connected to a coupling 12. A mechanical connection, explained below, is to be found between the pivot mechanism 11 and the coupling 12. Pivot mechanism 11 can be referred to as the driving member of the adjusting mechanism and coupling 12 can be properly referred to as the driven member.

Referring to FIG. 2, a rotary chisel 15 is inserted in a tool slide 17 for the machining of a work piece 16 inserted in a turning machine not shown, this slide being mounted so as to be capable of longitudinal displacement on a slide guide 18 arranged on the base of the machine tool. A stop bolt 19 is inserted in the slide guide 18.

On the tool slide 17, an angled member 20 is mounted and an adjustment spindle 21, arranged coaxially to the stop bolt, is screwed into it. A threaded disc 22 is screwed onto the adjustment spindle 21, a set of plate springs 23 being yoked in between this disc and the angled member 20. These springs serve to force the adjustment spindle 21 without play against the thread flanks of the tool slide 17, which is threaded and which produces a friction impulse as a resistance to unintended displacement of the adjustment spindle 21. A stop member 25 secured on the angled member 20 by means of a screw, engages in one of the radial indentations of the threaded disc 22, thereby preventing rotation of the threaded disc 22. A pressure spring 26, yoked in between the slide guide 18 and the workpiece 20, urges the adjustment spindle 21 away from the stop bolt 19. A thrust member, not shown, actuates movement of the slide 17.

A drum housing 28 is mounted non-rotatably on a cylindrical part of the adjustment spindle 21 which is provided with a collar 27. A central coupling member 29 and two outer coupling shoe members 30 and 31 are accommodated in the drum housing 28. The central coupling member 29 is rotatably mounted on a remote part 32 of the adjustment spindle 21 and is secured in its axial position by means of a spring coil 33. The outer coupling members 30, 31 are each guided on a screw 34, 35 respectively, which is screwed into the central coupling member 29 and the head of which is situated in a recess of the outer coupling shoe member 30, 31 respectively. Between the head of the screw 34, 35 and the base of the recess of the central coupling member 30, 31 which is in each case coordinated, a coil spring 36, 37 is positioned, which urges the outer coupling member 30, 31 against the central coupling member 29. Interposed discs 38 are inserted between the central coupling member 29 on one side and the outer coupling shoe members 30 or 31 on the other side. The coupling members 29 to 31 form a type of cylindrical body, which is positioned, with clearance, in the drum housing 28, the outer coupling members 30 and 31 having such great clearance of movement with regard to the central coupling member 29 that they can be brought into contact with the drum housing 28 to act as a clutch.

In the central coupling member 29, two cylindrical bores 41 and 42 are situated, extending parallel to the axes of the screws 34, 35, in which bowl-shaped sealings are mounted capable of displacement and are supported in each case by a piston 44. Each of the pistons 44 has a pin 45, with the aid of which it is accommodated in the outer coupling shoe member 30 or 31 which is coordinated with it. A pivot member 47 is secured on the central coupling member 29 by means of screws 46 and has a channel for pressure means 48, extending transversally to the axis of the adjustment spindle 21 and connected to the two cylindrical bores 41, 42 in the central coupling member 29 as well as with a juncture member 49.

In the pivot member 47, a cylindrical bore 52 is provided perpendicular to the longitudinal axis of the adjustment spindle 21 (FIG. 3), this cylindrical bore 52 being connected to a junction member 53 and in which a piston 54 is mounted capable of longitudinal displacement. Piston 54 is capable of protruding from the cylindrical bore 52 on the side remote from the junction member 53. A bore 55 is provided coaxially to the cylindrical bore 52 to accommodate a hollow spring bolt 56 which is adapted for axial displacement in the bore and for protrusion from it in the direction of the piston 54. A compression return spring 57 is yoked in and compressed between the spring bolt 56 and an adjusting screw 60, which is screwed into the front wall of the accommodating bore 55. Between the piston 54 and the spring bolt 56 is situated, a part of the angled member 20, which part projects into a recess of the pivot member 47. An adjustable limiting bolt 58 is arranged with its axis parallel to the spring bolt 56 and can be fixed in the desired position by means of a securing set screw 59.

The juncture member 49 is joined to the supply pipe 9 and the juncture member 53 to the supply pipe 8. If a pressure medium, such as compressed air, is conducted through the supply pipe 9, by acting on the sealings 43 in the cylindrical bores 41 and 42, the coupling is actuated radially outwardly by displacement of the outer coupling members 30 and 31, so that a positive connection is established between the pivot member 47 and the drum housing 28. Subsequently, owing to the time delay attained by the throttle position 10, the pivot mechanism 11 is actuated, the piston 54 thereby being displaced with regard to the action of the return spring 57 until the angled member 20 comes into contact with the limiting bolt 58. The drum housing 28 and consequently the adjustment spindle 21 are thereby rotated in the clockwise direction. If the supply pipe 9 is connected to atmosphere, the pressure in the cylindrical bores 41 and 42 is first of all reduced and then, after a time delay, the pressure is reduced in the cylindrical bore 52. The coupling 12 is therefore loosened before the piston 54 is returned to its starting position by the action of the return spring 57, taking with it the angled member 20. The adjustment spindle 21 is not actuated for the return movement.

If the supply pipe 8 is connected to the pressure source 6, the pivot mechanism 11 is first actuated and then subsequently the coupling 12. The piston 54 is therefore displaced with regard to the action of the return spring 57, but the drum housing 28 is not taken with it. After connecting the supply pipe 8 to atmosphere, first the cylindrical bore 52 and subsequently the cylindrical bores 41 and 42 are disengaged, so that the coupling is still effective whilst the piston 54 is returned to its starting position by the action of the return spring 57. Thus the adjustment spindle 21 is moved in the counter-clockwise direction.

The positioning valve 4 for attachment of one of the supply pipes 8 and 9 to the graduated valve 5 and the connection of the graduated valve 5 with the pressure source or atmosphere is controlled by the measuring device 3, the classification device 62 and the control function 63, according to the diameter of the workpiece 2, which is ascertained with the aid of the measuring sensor 1. For greater deviations of dimensions several stages of the circuit are carried out successively.

The adjustment stages for positioning or withdrawing the rotary chisel 15 from the workpiece 16 can be kept relatively small by corresponding selection of the inclination of the adjustment spindle 21 and the pivot angle of the pivot member 47. The size of the adjustment stages can be regulated by adjusting the limiting bolt 58 to correspond to the prevailing conditions and the allowable tolerances. To start the machine tool, the drum housing 28 can be turned by hand in the clockwise or counter-clockwise direction when the coupling is at rest, and the adjustment spindle 21 is thereby actuated. The drum housing 28 can also be actuated when the measuring device 3 is switched on. The expense of the measuring and control member is relatively slight, since only simple adjustment impulses are required by the control function 63 for actuation of the valves 4 and 5.

In the classification device 63, the dimension classes are established by adjustable marginal contact and the following significance is assigned to them:

Dimension Class D:

The workpiece dimensions lie within a narrow range in the centre of the permissible workpiece tolerance. Correction of the dimensions is not required.

Dimension Class C and E:

The workpiece dimensions lie within a narrow range above or below the dimension class D. One adjustment step for advancing or withdrawing the tool is required, in order that the workpiece which is to be machined subsequently, again falls within the dimension class D.

Dimension Class B and F:

The workpiece dimensions lie within a range which is further removed from the tolerated dimensions D. Two adjustment steps for advancing or withdrawing the tool are required, in order that the workpiece, which is to be machined subsequently, again falls within the dimension class D.

Dimension Class A and G:

The workpiece dimensions are above or below the permissible limits of tolerance for the workpiece. Further production is interrupted by bringing the automatic lathe to a standstill.

The control function 63 undertakes the assignment to the individual dimension classes. It receives the adjustment signal for the individual adjustment steps from the switch 64 controlled by cams of the automatic lathe for each working clearance. As a safety measure against erroneous displacement, the presence of the workpiece 2 is tested by the switch 65 and if a workpiece is lacking, e.g., at the beginning of the bar of work material, the adjustment process is not set in motion.

The control function 63 transmits the adjustment signal, always according to the position of the workpiece dimensions within the dimension classes: stoppage of the automatic lathe for the dimension classes A and G by influencing the driving motors which are represented by the motor symbol 66. For the dimension classes B, C, E and F the valves 4 and 5 receive the positioning signals according to the number and adjustment mechanism, and consequently influence the tool slide 17 of the automatic lathe, not shown, through the adjustment spindle 21, the dimensions of the workpiece, which is to be machined subsequently with the rotary tool 15, thereby being modified. The auxiliary energy required for the adjustment process is drawn from a source of pressure, for example, a source of compressed air.

What is claimed is:

1. An apparatus for adjusting the tool carriage of a machine tool in order to reproduce in a workpiece a dimension in accordance with a like dimension in a previously produced model workpiece, the apparatus comprising means for sensing the dimension of a workpiece mounted in a machine tool, said means being initially adjustable to a null position with the model workpiece;

means responsive to said means for sensing, for producing a control signal representative of the deviation of the dimension in a subsequent workpiece from the model dimension;

an adjustable tool carriage;

means for stepwise adjusting said tool carriage;

a source of fluid under pressure; and valve means coupled to said source and to said means for adjusting and responsive to said control signal for selectively providing fluid from said source to said means for adjusting, said means for adjusting including a driven member connected to said carriage and movable to incrementally move said carriage;

a driving member mounted for limited pivotal motion and actuated by fluid under pressure provided by said valve means; and clutch means for selectively coupling said driving member to said driven member, and wherein said driving member comprises a pivotally movable body;

a piston and cylinder coupled to said valve means;

a fixed, non-rotatable body connected to said tool slide, said piston being operative against said fixed body to cause pivotal movement of said pivotally movable body from a first position to a second position when supplied with fluid under pressure from said source; and spring means operative between said fixed and pivotally movable body to move the movable body from said second position to said first position when fluid pressure is removed.

2. An apparatus according to claim 1 wherein said driving member further comprises adjustable stop means for adjustably limiting the amount of pivotal movement between said first and second positions.

3. Apparatus according to claim 1 wherein said driven member comprises a cylindrical drum; and said clutch means comprises radially movable shoes carried by said driving member in closely spaced relationship with said drum; and piston means coupled to said valve means for selectively radially moving said shoes into frictional engagement with said drum, thereby causing said driven and driving members to move together.

4. Apparatus according to claim 3 wherein said valve means for selectively and sequentially applying fluid under pressure to one of said piston means in said clutch means and to said driving means in said means for adjusting, the one of said means selected for first application of fluid pressure being determinative of the direction of adjustment accomplished by said means for adjustment.

5. Apparatus according to claim 4 wherein said valve means includes a conduit having a time delay device therein.

6. An apparatus for adjusting the tool carriage of a machine tool in order to reproduce in a workpiece a dimension in accordance with a like dimension in a previously produced model workpiece, the apparatus comprising means for sensing the dimension of a workpiece mounted in a machine tool, said means being initially adjustable to a null position with the model workpiece;

means responsive to said means for sensing, for producing a control signal representative of the deviation of the dimension in a subsequent workpiece from the model dimension;

an adjustable tool carriage;

means for stepwise adjusting said tool carriage;

a source of fluid under pressure; and valve means coupled to said source and to said means for adjusting and responsive to said control signal for selectively providing fluid from said source to said means for adjusting, said means for adjusting including a driven member connected to said carriage and movable to incrementally move said carriage;

a driving member mounted for limited pivotal motion and actuated by fluid under pressure provided by said valve means; and clutch means for selectively coupling said driving member to said driven member, said clutch means comprising first and second parallel cylindrical bores in said driving member;

first and second pistons in each of said bores, said pistons being axially movable under fluid pressure;

first and second friction elements, one of said elements being disposed adjacent and movable by said first pistons, and the other of said element being disposed adjacent and movable by said second pistons, the movement thereof under the influence of fluid pressure being in the direction of coupling the driving and driven members together; and spring means for urging said friction elements toward uncoupled positions.

7. An apparatus for adjusting the tool carriage of a machine tool in order to reproduce in a workpiece a dimension in accordance with a like dimension in a previously produced model workpiece, the apparatus comprising means for sensing the dimension of a workpiece mounted in a machine tool, said means being initially adjustable to a null position with the model workpiece;

means responsive to said means for sensing, for producing a control signal representative of the deviation of the dimension in a subsequent workpiece from the model dimension;

an adjustable tool carriage;

means for stepwise adjusting said tool carriage;

a source of fluid under pressure; and valve means coupled to said source and to said means for adjusting and responsive to said control signal for selectively providing fluid from said source to said means for adjusting, said means for adjusting including a driven member connected to said carriage and movable to incrementally move said carriage;

a driving member mounted for limited pivotal motion and actuated by fluid under pressure provided by said valve means; and clutch means for selectively coupling said driving member to said driven member, and wherein said driven member includes a threaded spindle restrained against axial movement in at least one direction, and said adjustable tool carriage is slidably movable axially with respect to said spindle and includes an internally threaded opening engaging said spindle whereby incremental rotation of said spindle causes sliding motion of said carriage.

8. An apparatus for adjusting the tool carriage of a machine tool in order to reproduce in a workpiece a dimension in accordance with a like dimension in an immediately previously produced model workpiece, the apparatus comprising means for sensing the dimension of a workpiece mounted in a machine tool instead of the previous workpiece, said means being initially adjustable to a null position with the model workpiece;

means responsive to said means for sensing, for producing a control signal representative of the deviation of the dimension in a subsequent workpiece from the model dimension;

an adjustable tool carriage;

means for stepwise adjusting said tool carriage;

a source of fluid under pressure; and valve means coupled to said source and to said means for adjusting and responsive to said control signal for selectively providing fluid from said source to said means for adjusting, said means for adjusting including a driven member connected to said carriage and movable to incrementally move said carriage;

a driving member mounted for limited pivotal motion and actuated by fluid under pressure provided by said valve means; and clutch means for selectively coupling said driving member to said driven member;

said apparatus further comprising a first fluid pressure conducting line interconnecting said valve means with said driving member and a second fluid pressure conducting line interconnecting said valve means and said clutch means, and a third fluid pressure conducting line interconnecting said first and second lines, said third line including means for restricting the flow of fluid pressure.

* * * * *